United States Patent
Helldörfer et al.

(10) Patent No.: US 8,401,739 B2
(45) Date of Patent: Mar. 19, 2013

(54) DEVICE FOR ACTIVATING A SECURITY SYSTEM IN A VEHICLE

(75) Inventors: Reinhard Helldörfer, Baiersdorf (DE); Günter Anton Fendt, Schrobenhausen (DE); Guido Wetzel, Neuburg (DE); Lothar Weichenberger, Königsmoos (DE)

(73) Assignee: Conti Temic Microelectronic, GmbH, Numberg (DE)

( * ) Notice: Subject to any disclaimer, the term of this patent is extended or adjusted under 35 U.S.C. 154(b) by 1439 days.

(21) Appl. No.: 10/575,200

(22) PCT Filed: Oct. 8, 2004

(86) PCT No.: PCT/DE2004/002236
§ 371 (c)(1), (2), (4) Date: May 9, 2011

(87) PCT Pub. No.: WO2005/035318
PCT Pub. Date: Apr. 21, 2005

(65) Prior Publication Data
US 2011/0209551 A1    Sep. 1, 2011

(30) Foreign Application Priority Data

| Oct. 9, 2003 | (DE) | 103 46 860 |
| Oct. 9, 2003 | (DE) | 103 46 864 |
| Oct. 9, 2003 | (DE) | 103 46 866 |
| Oct. 9, 2003 | (DE) | 103 46 868 |
| Oct. 9, 2003 | (DE) | 103 46 869 |
| Oct. 9, 2003 | (DE) | 103 46 870 |
| Oct. 9, 2003 | (DE) | 103 46 871 |
| Oct. 11, 2003 | (DE) | 103 47 268 |
| Oct. 11, 2003 | (DE) | 103 47 270 |

(51) Int. Cl.
*B60R 21/01* (2006.01)
(52) U.S. Cl. .......... 701/45; 280/735; 180/282
(58) Field of Classification Search .......... 280/735; 701/45; 180/282; *B60R 21/01*
See application file for complete search history.

(56) References Cited

U.S. PATENT DOCUMENTS

| 7,502,677 B2 * | 3/2009 | Weichenberger et al. | 701/45 |
| 7,774,116 B2 * | 8/2010 | Brandmeier et al. | 701/47 |
| 7,831,357 B2 * | 11/2010 | Loeckle et al. | 701/45 |
| 8,032,275 B2 * | 10/2011 | Lich | 701/32.2 |
| 8,076,958 B2 * | 12/2011 | Fey et al. | 327/46 |
| 8,249,779 B2 * | 8/2012 | Rauh et al. | 701/45 |
| 2010/0256873 A1 * | 10/2010 | Trinh et al. | 701/46 |

FOREIGN PATENT DOCUMENTS

| DE | 37 36294 | 5/1989 |
| DE | 9218620 | 8/1994 |
| DE | 09509179 | 9/1995 |
| DE | 12545013 | 6/1997 |

(Continued)

*Primary Examiner* — Ruth Ilan (57) ABSTRACT

Disclosed is a device for activating a security system in a vehicle including a first and second vehicle sensor (4). The sensor include, respectively, a measuring value sensor (4.1) which can detect acceleration and structure-borne noise, and a central unit (2) which evaluates the signals of at least two vehicle sensors (4) and activates the security system according to the signals. The first and second vehicle sensors have a first direction of sensitivity for at least one measuring value sensor (4.1), which is used to detect acceleration, and a second direction of sensitivity for at least one measuring value sensor (4.1) which is used to detect structure-borne noise.

14 Claims, 7 Drawing Sheets

FOREIGN PATENT DOCUMENTS

| | | |
|---|---|---|
| DE | 19651123 | 6/1998 |
| DE | 19841947 | 3/2000 |
| DE | 100 59 104 | 6/2000 |
| DE | 19963348 | 7/2001 |
| DE | 10015273 | 10/2001 |
| DE | 10034524 | 1/2002 |
| DE | 10031793 | 2/2002 |
| DE | 10059104 | 6/2002 |
| DE | 1010307 | 7/2002 |
| DE | 10206351 | 9/2003 |

\* cited by examiner

Fig. 1

PRIOR ART

Fig. 2

PRIOR ART

DEVICE FOR ACTIVATING A SECURITY SYSTEM IN A VEHICLE

BACKGROUND OF THE INVENTION

The invention relates to a device for activating a security system in a vehicle at least two vehicle sensors (4), each of which can record vibrations in frequency ranges, which are generated both by an acceleration and by structure-borne noise, and which comprise in each case at least one measuring value sensor (4.1) for recording vibrations, and a central unit (2) which evaluates the signals from the vehicle sensors (4), and which activates the security system according to said signals, and a related procedure for activating a security system in a vehicle with at least two vehicle sensors (4), which record the vibrations in frequency ranges which are generated both by an acceleration and by structure-borne noise, and which comprises in each case at least one measuring value sensor (4.1) to record vibrations, and a central unit (2) which evaluates the sensor signals from the vehicle signals, and which activates the security system according to said signals.

Vehicle security systems require sensors to record the each driving or accident situation in order to react in an appropriate way. It is known that measuring value sensors can be used as crash sensors in order to record the acceleration and structure-borne noise. An impact with an obstacle or a collision with an obstacle is detected by the evaluation of the measured acceleration and the measured structure-borne noise, and safety measures are initiated by the security system accordingly. Determining the origin of an impact is of great importance in order to improve the use of security systems such as airbags, belt tighteners or pedestrian protection systems.

Sensors known to date which are used to record the structure-borne noise are designed to record preferably transverse structure-borne noise waves. Since no one individual sensor of this type is capable of determining the direction of dissemination of a transverse structure-borne noise wave, several sensors must be linked in order to determine the location of the source of the structure-borne noise wave, and in part, the evaluation of the measured structure-borne noise values involves, in part, extensive and complex calculations.

Sensors to record the acceleration and the structure-borne noise have a further, decisive disadvantage. Their direction of sensitivity for recording the structure-borne noise is often not the same as the direction of sensitivity for recording the acceleration. For this reason, more than two sensors frequently have to be provided to determine the impact location of the obstacle in order to guarantee that the security system will be activated in a manner appropriate to the accident.

A control device for a security system is known from DE 100 15 273 A1, in which four sensors for recording the acceleration and structure-borne noise are provided, which are arranged in such a manner that each sensor comprises a different direction of sensitivity. In this way, it is not only possible to determine the direction of the acceleration, but also be determine faults in the sensors.

SUMMARY OF THE INVENTION

The object of the present invention is to recommend a device and a procedure for activating a security system in a vehicle which is suitable for recording acceleration and structure-borne noise.

This object is attained by means of a device for activating a security system in a vehicle with the features described herein, and a corresponding procedure with the features described herein.

An essential principle of the invention consists of the fact that a suitable arrangement of vehicle sensors, which is capable of recording both an acceleration and the vibrations within a structure-borne noise wave, the direction of sensitivity for recording an acceleration and the direction of sensitivity for recording structure-borne noise being aligned either differently or in the same way following modifications made to the structure of the vehicle sensor and to the manner in which it is fitted. In this way, the number of vehicle sensors required, for example to determine the impact location when a crash occurs, can be minimised.

The invention now relates to a device for activating a security system in a vehicle with at least one vehicle sensor, which is capable of recording vibrations in frequency ranges which are caused by both an acceleration and by structure-borne noise, and which comprises at least one measuring value sensor for recording vibrations and a central unit, which evaluates the signals of at least one vehicle sensor, and which activates the security system according to said signals. Here, at least one vehicle sensor comprises a first direction of sensitivity of at least one measuring value sensor for recording the acceleration, and a second direction of sensitivity of at least one measuring value sensor for recording the structure-borne noise. In this way, the acceleration and the structure-borne noise can be recorded in identical or different directions of sensitivity. In this way, the vehicle sensor can be used in areas in which the directions of sensitivity for recording the acceleration and the structure-borne noise must necessarily be identical, for example in order to activate a passenger protection system. Equally, it can be used in areas where different directions of sensitivity are required for recording the acceleration and the structure-borne noise, for example in order to verify the signal from an activation signal for a passenger protection system. Furthermore, it can be used in vehicle diagnosis systems where a vibration analysis of certain vehicle elements is required.

The device preferably comprises at least a second vehicle sensor, which delivers signals to the central unit. When two vehicle sensors are used, a level formed from a vehicle transverse axis and a vehicle longitudinal axis, for example, can already be monitored with regard to the acceleration and structure-borne noise, in particular the longitudinal structure-borne noise.

In particular, the first direction of sensitivity and the second direction of sensitivity of the vehicle sensor can be almost identical. In this way, a vehicle sensor can record both the acceleration and the structure-borne noise in a combined direction of coverage.

Furthermore, a direction of sensitivity of the first vehicle sensor which results from the first and second direction of sensitivity of the first vehicle sensor, and a direction of sensitivity of at least one second vehicle sensor which results from the first and second direction of sensitivity of at least one second vehicle sensor can be aligned at a specified angle to each other. For example, in order to detect a crash, it is often necessary to monitor several directions in one level or in one area which relate to changes to the accelerations or structure-borne noise of relevance to the crash.

The first and second vehicle sensor can be arranged in such a manner that the specified angle is almost zero.

In order to monitor with two vehicle sensors a level formed from a vehicle transverse axis and a vehicle longitudinal axis with regard to acceleration and structure-borne noise, the first and at least one second vehicle sensor are arranged in such a manner that the specified angle is almost 90 degrees, the first and second direction of sensitivity of each of the vehicle sensors deviating from each other by no more than 20 degrees.

Furthermore, the first direction of sensitivity and the second direction of sensitivity of each vehicle sensor can be aligned to each other at an angle of almost 90 degrees. Any directions of sensitivity which deviate from each other are required, for example, when a verification is conducted of an activation signal for a security system in a vehicle which has been determined on the basis of a first vehicle sensor, using a verification signal which has been generated by a second vehicle sensor. Here, the vehicle sensors can, for example, be arranged in such a manner that the first direction of sensitivity of the first vehicle sensor matches the second direction of sensitivity of the second vehicle sensor, and vice-versa. An activation signal which is determined from the acceleration of the first vehicle sensor is thus linked to a verification signal which is determined from the structure-borne noise of the second vehicle sensor, and vice-versa.

For this reason, the first and at least one second vehicle sensor can be arranged in such a manner that the first direction of sensitivity of the first vehicle sensor and the second direction of sensitivity of the second vehicle sensor of at least one second vehicle sensor are almost identical, and vice-versa. With an arranged in this form, whereby the first and second direction of sensitivity of each of the vehicle sensors differ by 90°, not only a level formed from the vehicle transverse axis and vehicle longitudinal axis can be monitored with regard to acceleration and structure-borne noise, but the signal verification mentioned above can be conducted for the activation signal for a security system in a vehicle generated from the recorded acceleration and the recorded structure-borne noise. For example, the signal portion of a first vehicle sensor which records the acceleration can be linked to the signal portion of a second vehicle sensor which records the structure-borne noise, in order to generate a verified activation signal for a security system, in particular a passenger protection system, in a central unit. In reverse, the same signal verification is possible with the signal portion of the second vehicle sensor which records the acceleration and the signal portion of the first vehicle sensor which records the structure-borne noise.

Preferably, at least one measuring value sensor is capable of recording the longitudinal structure-borne noise. The advantage of recording and evaluating longitudinal structure-borne noise waves as compared to transverse structure-borne noise waves is that it is possible to determine the source of the longitudinal structure-borne noise wave, and thus the source of the collision with an obstacle.

In particular, the device is designed to conduct a signal verification of a signal portion of the acceleration and/or the structure-borne noise of the first vehicle sensor with a signal portion of the acceleration and/or structure-borne noise of at least one second vehicle sensor. It is also possible to incorporate signals from additional activation sensors in order to verify the signal.

Furthermore, the device can be design to conduct a signal verification of the signal portion of the acceleration of the first vehicle sensor with the signal portion of the structure-borne noise of the first vehicle sensor.

In addition, the device can be designed to conduct a signal verification of the signal portion of the acceleration of at least one second vehicle sensor with the signal portion of the structure-borne noise of at least one second vehicle sensor. Each vehicle sensor thus conducts one signal verification of both of the two signal portions, which is a simple technical process.

The vehicle sensor can also comprise a bracket for affixing the measuring value sensor to a vehicle element, a sensor housing, a seismic mass for recording the acceleration and the processing unit for processing the measuring value sensor signals, whereby at least one measuring value sensor is attached to the bracket via a connection.

Furthermore, at least one measuring value sensor can be attached to a bracket via a tensionally locked connection, which makes it possible to record the acceleration and/or the structure-borne noise. The tensionally locked connection is here designed in such a manner that a transmission, for example of the longitudinal structure-borne noise, is guaranteed from a vehicle element to the measuring value sensor.

In particular, the connection for attaching the measuring value sensor to the bracket is designed in such a manner that the recording of unwanted signals by the measuring value sensor is reduced or prevented. Since the longitudinal structure-borne noise waves comprise lower amplitudes in comparison with the transversal structure-borne noise waves, or in comparison with the acceleration, it is advantageous when unwanted signals are already absorbed when the connection used for attaching the bracket is made.

A low-cost way of creating an attachment connection to the bracket can to use adhesive, for example.

Furthermore, the bracket is designed, regardless of its construction, to determine the measuring characteristics of the vehicle sensor. A vehicle sensor of this type can be varied in terms of its measuring characteristics during the manufacturing process or through programming in such a way that it can be used variably for different purposes. As a result, large number of this vehicle sensor can be produced at low prices, for example.

Furthermore, the bracket is designed, regardless of its construction, to enable the acceleration and/or the structure-borne noise to be recorded. In particular, it enables vibration parts of the structure-borne noise, such as the longitudinal structure-borne noise, to be transmitted in a specified direction, in order to make these available to the measuring value sensor. Here, the bracket can comprise a mounting element such as one used to attach a piezoelectric recorder as a measuring value sensor. The bracket can, on the other hand, also be a construction comprising several mounting elements, for example when a measuring value sensor designed as an ASIC sensor is attached to a first mounting element for bonding, is cast with a moulding mass and then attached to a circuit board as a second mounting element.

In order to make it possible to measure longitudinal structure-borne noise waves, for example, which comprise a comparatively low amplitude, it is also advantageous to absorb unwanted signals buy constructing the bracket in a suitable manner. For this reason, the bracket is designed to reduce, or even to prevent, unwanted measuring components from being received by the measuring value sensor.

Both the bracket and the connection for attaching the measuring value sensor to the bracket are designed to enable the longitudinal structure-borne noise to be recorded. Recording the longitudinal structure-borne noise is technically more complicated, since the longitudinal structure-borne noise comprises lower amplitudes in comparison with the transverse structure-borne noise. Since in comparison with transverse structure-borne noise waves, longitudinal structure-borne noise waves make it possible to determine the source of the longitudinal structure-borne noise wave, and thus the source of the collision with an obstacle, however, the bracket and the connection for attaching the measuring value sensor to the bracket are designed in such a manner as to make it possible to transmit the vibration parts of a longitudinal structure-borne noise wave from a vehicle element to the measuring value sensor, while at the same time absorbing unwanted signals.

In particular, the bracket is designed, depending on its structure, to determine the first and second direction of sensitivity of the vehicle sensor. It is thus possible, depending on the installation site and the setting of the vehicle sensor, to define both identical and non-identical directions of sensitivity in order to record the acceleration and the structure-borne noise.

In particular, the bracket is designed, depending on its curvature, to determine a first direction of sensitivity of at leas one measuring value sensor for recording the acceleration, and a second direction of sensitivity of at least one measuring value sensor for recording the structure-borne noise. If the measuring value sensor is a piezoelectric sensor, for example, the directions of sensitivity can be aligned via a curvature in the bracket in such a manner that both identical and non-identical directions of sensitivity can be adjusted, depending on the application site and the setting of the vehicle sensor.

In particular, the vehicle sensor can be attached within the vehicle passenger cell or in protected hollow spaces within the vehicle if the device for activating a security system in a vehicle is a passenger protection system, for example.

Furthermore, the vehicle sensors can be attached within or in the direct vicinity of the central unit. Since the vehicle sensors also record the structure-borne noise as well as the acceleration, it is not an absolute requirement that they are attached near the outer shell of the vehicle, since the structure-borne noise waves are disseminated far more quickly in the vehicle than the vibrations generated by changes in the acceleration, and a crash can be detected within the time necessary to activate the security system.

When the vehicle sensors are used in a device for activating a pedestrian protection system, for example, the vehicle sensors can be attached at a distance of approximately 20 centimeters from the outer shell of the vehicle, for example.

If the measuring value sensor is designed as a piezoelectric sensor, or as a strain gauge, for example, the seismic mass can be adhered to at least one measuring value sensor.

On the other hand, the seismic mass can be designed as part of the measuring value sensor when the measuring value sensor is a micromechanical sensor, for example.

In particular, at least one measuring value sensor can be designed to record a specific acceleration range. A specific acceleration range is specified, depending on the installation site and the purpose of the installation of the vehicle sensor, which lies between +/−1 g and +/−1,000 g. If the vehicle sensor is used in the fender area of the vehicle, for example, it should record accelerations in a low range which correspond to a collision with a light object and accelerations in a high range up to +/−1,000 g, which correspond to a collision with another vehicle, for example.

On the one hand, at least one measuring value sensor can be designed to make it possible to program a specific acceleration range. This enables a customer-specific setting for a specific acceleration range following after the vehicle sensor has been produced, for example.

On the other hand, at least one measuring value sensor can be designed to make it possible to create a setting for a specific acceleration range while the vehicle sensor is being produced. This already enables a suitable acceleration range to be defined while the vehicle sensor is being produced by selecting appropriate technology or an appropriate structure.

Furthermore, the processing unit can comprise a filter for the selective recording of the acceleration and/or the structure-borne noise. This provides a signal at the vehicle sensor exit which supplies the necessary frequency parts of the acceleration and structure-borne noise. An external signal filter is no longer required, and reduces the complexity of the procedure for further evaluating the vehicle sensor signal.

The filter in the processing unit can be programmable in order to enable the selective recording of the acceleration and/or structure-borne noise. In this way, customer-specific programming of the filter characteristics can be undertaken, in order to be able to select the signal portions required for their specific application.

On the other hand, the filter in the processing unit can be designed in such a manner that it can be adjusted while the vehicle sensor is being manufactured, in order to enable a selective recording of the acceleration and/or the structure-borne noise. In this way, the signal portions required for a specific application can already be selected while the vehicle sensor is being produced.

In particular, the processing unit is designed in order to record signals from the measuring value sensor with a high amplitude, without recording any overtravel of the amplifier circuit arranged in the processing unit. The amplifier circuit must be designed in such a manner that it is possible to record and amplify the signals from the measuring value sensor relating to the longitudinal structure-borne noise, for example, which comprise lower amplitudes compared to those from transverse structure-borne noise, but also enabling the measuring value signals from the acceleration or transverse structure-borne noise with higher amplitudes to be recorded and amplified.

At least one measuring value sensor can be a piezoelectric sensor, a strain gauge, a micromechanical sensor or a magnetic restrictive sensor. Depending on the installation site of the vehicle sensor, the vehicle sensor can be implemented in a simple, low-cost manner when a suitable measuring value sensor is selected. For applications in which the first and second directions of sensitivity of the vehicle sensors must be almost identical, the use of a micromechanical sensor is advantageous, for example, which, depending on the structure, comprises an identical first and second direction of sensitivity. For applications in which different directions of sensitivity are required, it is on the other hand advantageous to use a piezoelectric sensor, for example, with which the required non-identical alignment of the directions of sensitivity can be achieved due to the curvature of the bracket.

The vehicle sensor can be designed as a moulded ASIC or as a mechatronic vehicle sensor.

Furthermore, the bracket can be designed as a Lead Frame suitable for the moulding technique, or as a mechatronic bracket suitable for the moulding technique.

Accordingly, the sensor housing can be designed as a moulding mass encompassing the bracket.

The vehicle sensor is preferably attached by pressing on or pressing in the bracket or sensor housing within the vehicle, or within a central unit.

Further options for using the device are for example its use in diagnosis or monitoring systems for which a vibration analysis for certain elements is required, such as ball bearing or roller bearing monitoring, use in systems which monitor road conditions for which a vibration analysis is conducted of the vibrations which occur in the chassis, with stability and braking systems in the vehicle, or with systems which regulate the vehicle dynamics.

The invention furthermore relates to a procedure for activating a security system in a vehicle with at least one vehicle sensor which records vibrations in frequency ranges which are caused both by an acceleration and by structure-borne noise, and which comprises at least one measuring value sensor to record vibrations, and a central unit which evaluates the sensor signals of at least one vehicle sensor and which activates the security system in accordance with this evaluation. At least one vehicle sensor here comprises a first direction of sensitivity of at least one measuring value sensor for recording the acceleration, and a second direction of sensitivity of at least one measuring value sensor for recording the structure-borne noise.

Preferably, at least one second vehicle sensor delivers signals to the central unit. With two vehicle sensors, a level which is formed from the transverse vehicle axis and the longitudinal vehicle axis, for example, can already be monitored with regard to acceleration and structure-borne noise, in particular longitudinal structure-borne noise.

The procedure is furthermore designed to enable the acceleration and/or structure-borne noise to be recorded using a suitable setting of the first and the second direction of sensitivity of at least one vehicle sensor. In this way, the acceleration and the structure-borne noise can be recorded in identical or non-identical directions of sensitivity.

The procedure is preferably designed to enable the acceleration and/or the longitudinal structure-borne noise to be recorded using a suitable setting of the first and the second direction of sensitivity of at least one vehicle sensor. The advantage of recording and evaluating longitudinal structure-borne noise waves as compared to transverse structure-borne noise waves is that it is possible to determine the source of the longitudinal structure-borne noise wave, and thus the source of the collision with an obstacle.

The procedure can also conduct a signal verification for a signal portion of the acceleration and/or the structure-borne noise from the first vehicle sensor with a signal portion of the acceleration and/or the structure-borne noise from at least one second vehicle sensor.

Alternatively, or in addition to this, the procedure can also conduct a signal verification of the signal portion of the acceleration of the first vehicle sensor with the signal portion of the structure-borne noise of the first vehicle sensor.

Equally, the procedure can conduct a signal verification of the signal portion of the acceleration of at least one second vehicle sensor with the signal portion of the structure-borne noise of at least one second vehicle sensor. In this way, each vehicle sensor conducts a signal verification of the two signal portions of the vehicle sensor, which is a simple technical process.

In order for a signal to be provided at the exit to the vehicle sensor, which delivers the required frequency parts of the acceleration and the structure-borne noise, the procedure can be designed to selectively filter the signals from the measuring value sensor.

Finally, the device according to the invention can also be used in vehicle diagnosis systems.

Further advantages and potential areas of application of the present invention are included in the description below with reference to the exemplary embodiments shown in the drawings.

In the description, the summary and the drawings, the terms and reference numerals used in the list of reference numerals appended apply.

DETAILED DESCRIPTION OF THE DRAWINGS

In the following, the application of the vehicle sensor according to the invention as an activation sensor for a passenger protection system is explained. However, this description should not be regarded as being limited to the invention, since the vehicle sensor can also be used advantageously for other areas of application, such as in diagnosis or monitoring systems for which a vibration analysis of certain elements is required, such as ball bearing or roller bearing monitoring, in road condition monitoring systems for which a vibration analysis of the vibrations which occur in the chassis is conducted, and in stability and braking systems in the vehicle or systems which regulate the vehicle dynamics.

Figure 1:
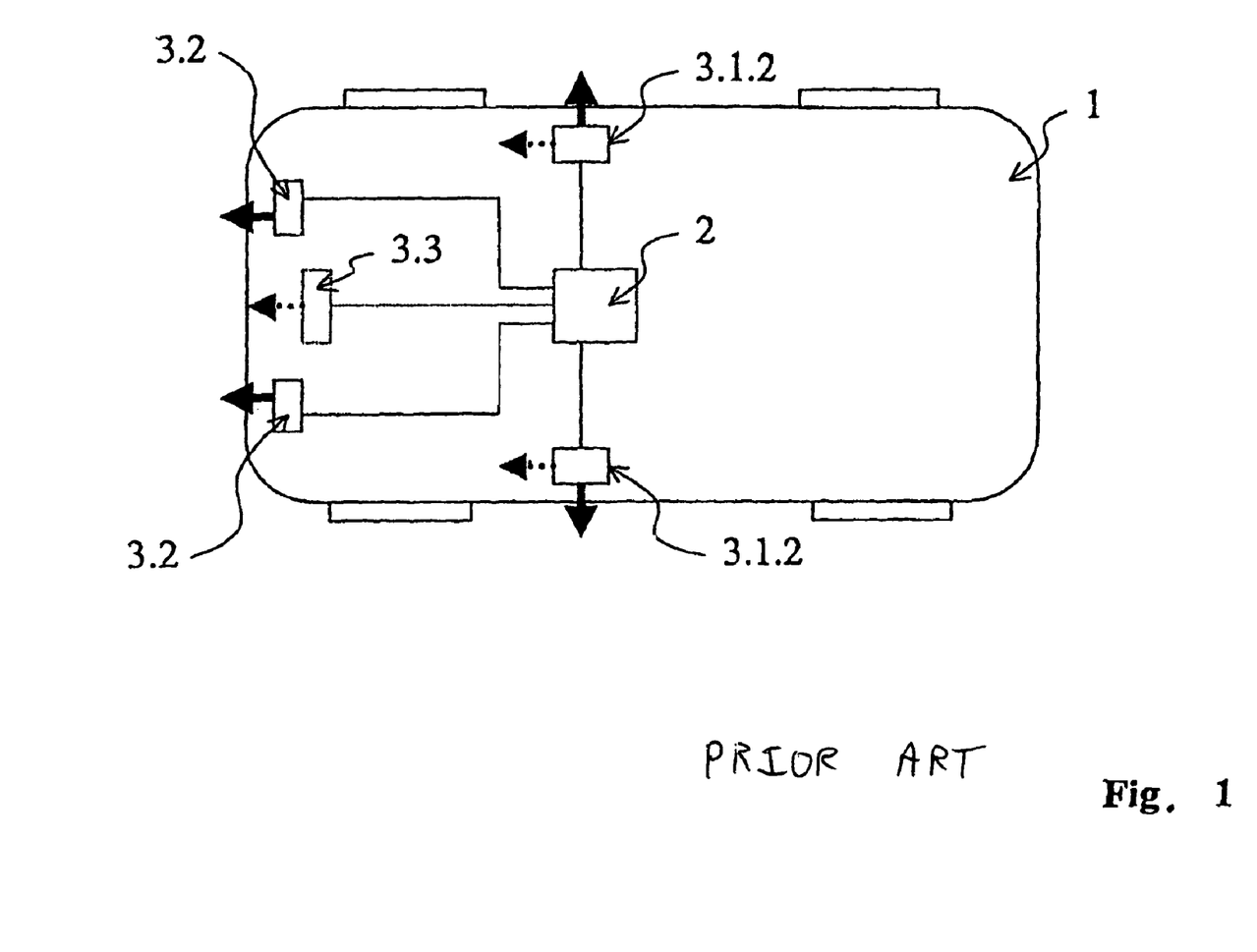
FIG. 1 shows an exemplary embodiment of a device for activating a security system in a vehicle according to the current art, with several activation sensors and a central unit.

FIG. 1 shows a device for activating a security system, in particular a passenger protection system in a vehicle according to the current art, with several activation sensors 3.1, 3.2, 3.3 and a central unit 2. The central unit 2 is positioned centrally in the vehicle, preferably in the central tunnel of the vehicle, and controls the corresponding security systems such as passenger protection systems or pedestrian protection systems.

The side sensors 3.1.2 are attached on the side in the vehicle 1 in order to detect a side crash, and have a direction of sensitivity towards the transverse vehicle axis. In addition, these sensors often include a direction of sensitivity towards the longitudinal vehicle axis. This additional direction of sensitivity makes it possible, for example, to verify a sensor output signal generated by the sensors 3.1.2, in particular when accidents occur in which the effect of the force produced during an accident or collision occurs at an oblique angle to the longitudinal or transverse axis of the vehicle.

The sensors 3.2, 3.3 which are attached in the front section of the vehicle are used as upfront sensors to detect a frontal crash, in which the effect of the force occurs primarily in the direction of the longitudinal axis of the vehicle. These sensors 3.2, 3.3 therefore have a direction of sensitivity towards the longitudinal axis of the vehicle. Here, either a single sensor 3.3 is arranged centrally in relation to the longitudinal axis of the vehicle, or two sensors 3.2 are arranged outside the longitudinal axis of the vehicle in the front section, for example in the fender.

The side sensors and upfront sensors are attached as close to the outer shell of the vehicle as possible, in order to be able to detect collisions with smaller objects as quickly as possible. Rapid detection of an impact is particularly important in the side section of the vehicle, since here, the crusher zone is relatively small, and a passenger protection system, for example, should be activated particularly quickly. However, these sensors near the outer shell of the vehicle are particularly susceptible to malfunctions compared to sensors which must be attached inside the vehicle, such as the side sensors. For this reason, structure-borne noise sensors are also used to detect a crash, which are not attached so close to the outer shell of the vehicle, since structure-borne noise waves disseminate far more quickly in the vehicle than vibrations which are generated by changes to the acceleration.

Figure 2:
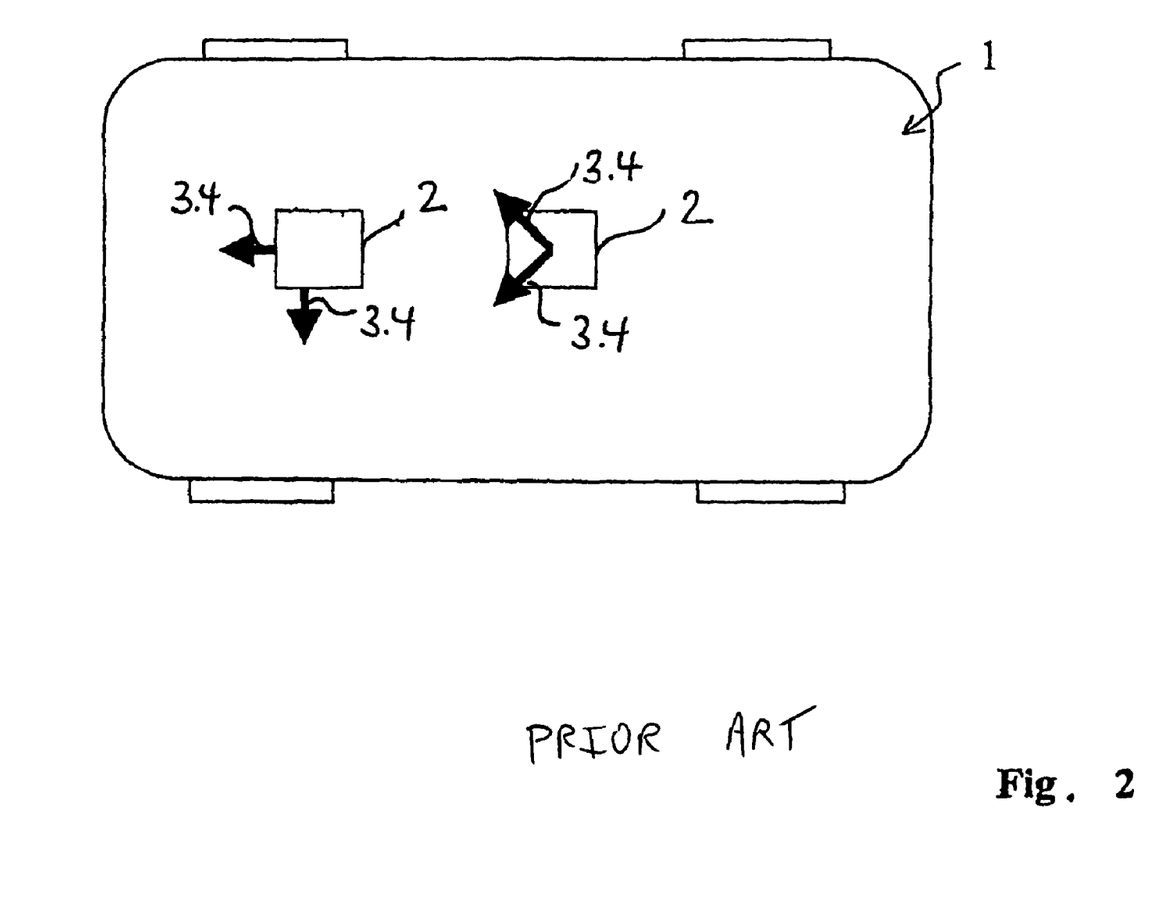
FIG. 2 shows two exemplary arrangements of acceleration sensors and a central unit of a device for activating a security system in a vehicle according to the current art.

FIG. 2 shows two exemplary arrangements of acceleration sensors 3.4 and a central unit 2 of a device for activating a security system in a vehicle 1 according to the current art. Using an arrangement of two acceleration sensors 3.4, the directions of sensitivity of which are aligned at a specific angle to each other, a level created from the longitudinal axis of the vehicle and the transverse axis of the vehicle can be monitored with regard to changes to the acceleration which are of relevance to a crash. Here, the two arrangements shown in FIG. 2 are preferably used, in which the directions of sensitivity are arranged at an angle of 90° to each other. In the first arrangement, the direction of sensitivity of the first acceleration sensor is aligned in parallel to the longitudinal axis of the vehicle, and the direction of sensitivity of the second acceleration sensor is aligned towards the transverse axis of the vehicle. In the second arrangement, the directions of sensitivity of the two acceleration sensors are offset at +/−45° to the long axis of the vehicle.

Figure 3:
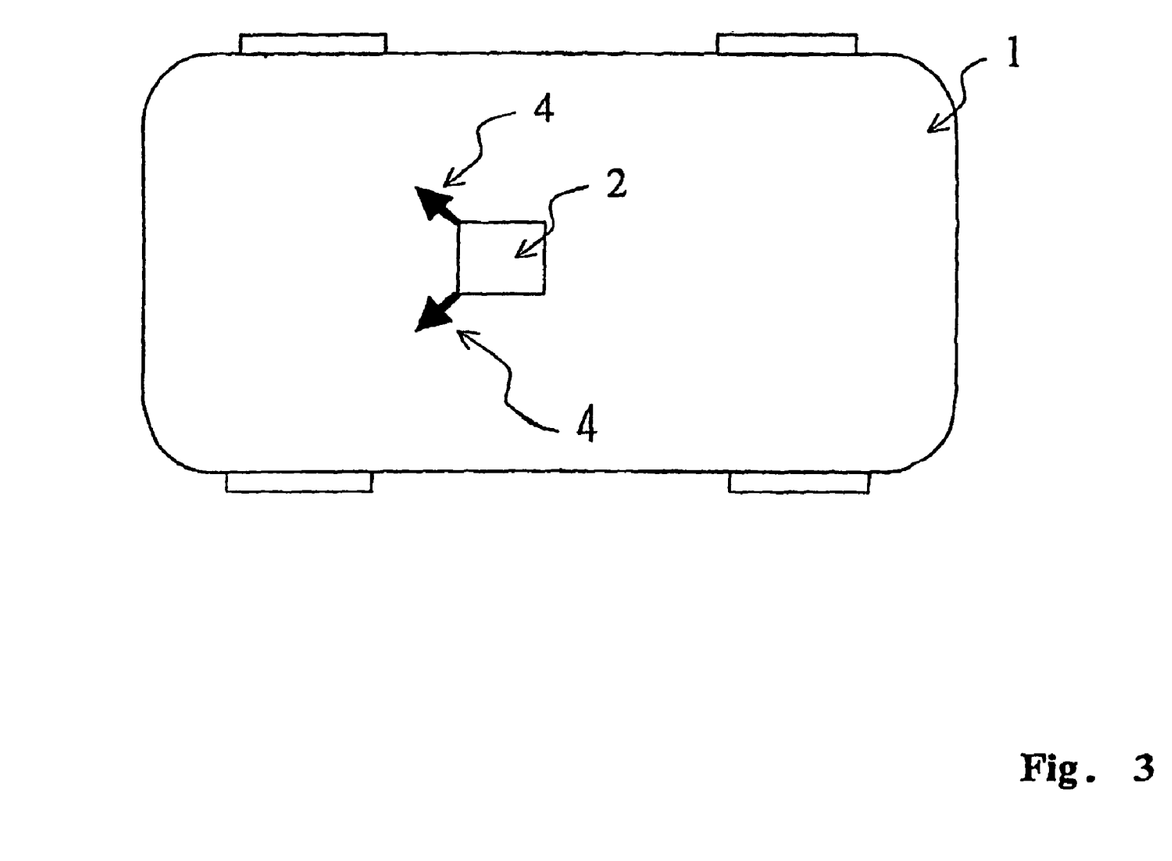
FIG. 3 shows an arrangement of vehicle sensors according to the invention and a central unit in a vehicle.

FIG. 3 shows an arrangement of vehicle sensors 4 and a central unit 2 in a vehicle. Since these vehicle sensors 4 record the structure-borne noise as well as the acceleration, it is not necessary to attach them near the outer shell of the vehicle, since the structure-borne noise waves disseminate far more quickly in the vehicle than the vibrations which are generated by changes to the acceleration, and a crash can be detected within the time necessary to activate the security system. With the arrangement of two vehicle sensors shown, a level created from the longitudinal axis of the vehicle and the transverse axis of the vehicle can be monitored with regard to structure-borne noise and changes to the acceleration which are of relevance to a crash.

Furthermore, it is possible to conduct a signal verification of the relevant sensor output signals from the vehicle sensors 4, whereby either the sensor output signal of the first vehicle sensor 4 is verified with the sensor output signal of the second vehicle sensor 4, or the signal portion of the vehicle sensor which transmits the acceleration, for example, is verified with the signal portion of the same vehicle sensor 4 which transmits the structure-borne noise. In addition, sensor output signals from other vehicle sensors 4 attached in the vehicle used for signal verification purposes.

Since the vehicle sensor 4 can be attached at different locations in the vehicle, where lower or higher accelerations can be measured depending on the accident situation, a specific acceleration range can be specified in relation to the application of the vehicle sensor 4 during the manufacturing process, which lies between +/−1 g and +/−1,000 g. If the vehicle sensor is installed in the fender section of a vehicle, for example, it should record accelerations in a low range, which occur following a collision with a light object, and acceleration in a high range up to +/−1,000 g which may for example occur following a collision with another vehicle. The acceleration range should be selected in such a manner that the vehicle sensor 4 measures the necessary accelerations on the one hand, in order to detect and accident, while on the other avoiding an overtravel in the processing unit when processing the signals from the measuring value sensor. Alternatively, the vehicle sensor can be designed in such a manner that the acceleration range can be programmed in a customer-specific way, depending on the way in which the vehicle sensor is to be used.

The processing unit 4.2 of the vehicle sensor comprises an amplifying circuit which amplifies the different signal portions which transmit the measured acceleration and structure-borne noise. In particular, the processing unit 4.2 is design to record signals from the measuring value sensor with a high amplitude, without an overtravel of the amplifying circuit. The amplifying circuit records and amplifies signals from the measuring value sensor from the longitudinal structure-borne noise, for example, which comprise lower amplitudes than those of transverse structure-borne noise, but also measuring value signals from the transverse structure-borne noise with higher amplitudes.

In order to provide a signal at the exit of the vehicle sensor, which delivers the required frequency parts of the acceleration and the structure-borne noise, the processing unit 4.2 comprises a filter to selectively record the acceleration and the structure-borne noise. An external signal filter is then no longer required, and reduces the complexity involved in a further evaluation of the signal from the vehicle sensor. The filter in the processing unit 4.2 can be programmable to enable the filter characteristics to be programmed in a customer-specific way, and to enable the customer to select the signal portions required for a specific application. Alternatively, the filter in the processing unit 4.2 can be designed in such a manner that it can be adjusted during the manufacturing process of the vehicle sensor. In this way, the signal portions required for a specific application can already be selected while the vehicle sensor is being produced.

Incidentally, the vehicle sensor 4 can be also be used for purposes other than crash detection. Further options for use are its use in diagnosis or monitoring systems, for example, in which a vibration analysis is required for certain elements, such as in ball bearing or roller bearing monitoring systems, use in systems which monitor road conditions, for which a vibration analysis is conducted of the vibrations which occur in the chassis, with stability and braking systems in the vehicle, or with systems which regulate the vehicle dynamics. Here, the vehicle sensors monitor the movements in a system. The directions of sensitivity of the acceleration and the structure-borne noise are specified by the application and are defined by the structure of the vehicle sensor while the vehicle sensor is being manufactured.

Figure 4A:
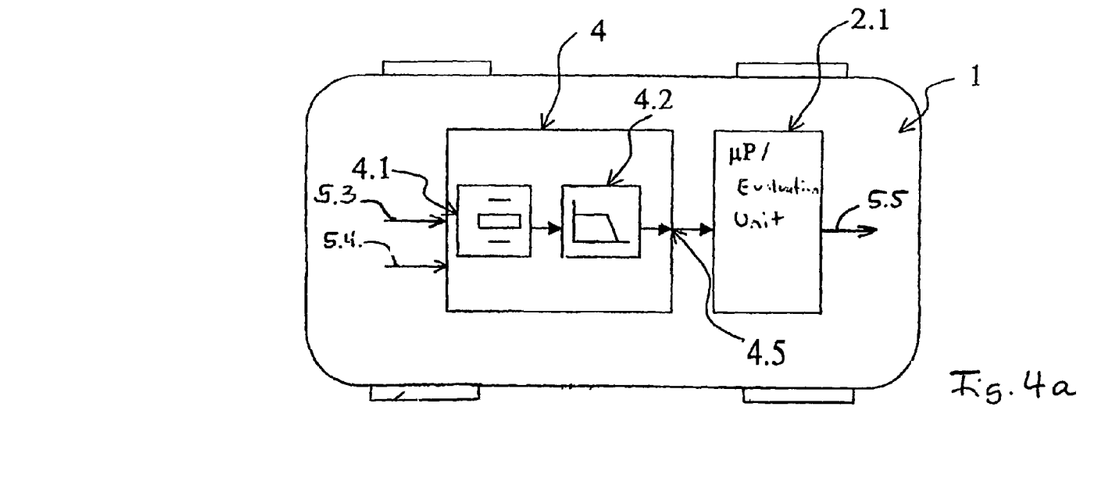
FIG. 4a shows a block diagram of the vehicle sensor.

FIG. 4a shows a block diagram of the vehicle sensor 4 which comprises a measuring value sensor 4.1 for recording the acceleration and structure-borne noise, and a processing unit 4.2 for processing the signals from the measuring value sensor. The processing unit 4.2 contains a filter for selectively recording the acceleration and the structure-borne noise. In this way, a sensor output signal 4.5 is provided which delivers the required frequency parts of the acceleration and the structure-borne noise. Since the longitudinal structure-borne noise waves comprise lower amplitudes compared to the transverse structure-borne noise waves, or compared to the acceleration, an amplifying circuit is provided accordingly, which makes it possible to process the longitudinal structure-borne noise waves. The processing unit 4.2 can also contain an A/D converter, which provides the sensor output signal 4.5 in digital form. The sensor output signal 4.5 is then processed in analogue or digital form by an evaluation unit 2.1 in the central unit 2, in order to generate an activation signal for ass, such as a passenger protection system.

Figure 4B:
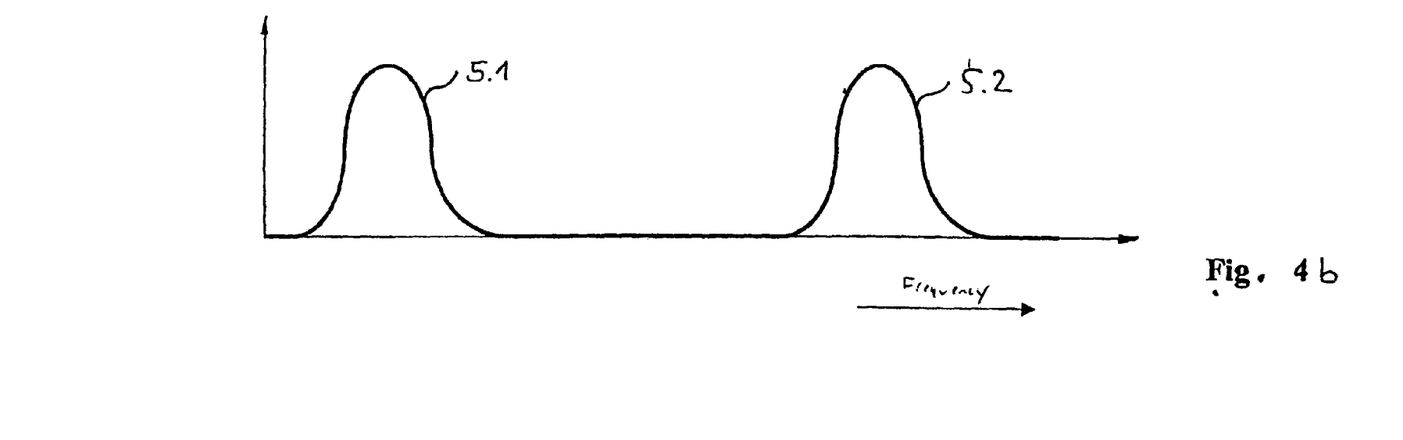
FIG. 4b shows the filter characteristics of the processing unit of the vehicle sensor.

FIG. 4b shows the corresponding filter characteristics of the processing unit 4.2 of the vehicle sensor 4 from FIG. 4a, in which the frequency parts of the acceleration in the lower frequency range (lower than approx. 500 Hz) and the frequency parts of the structure-borne noise in the upper frequency range (higher than approx. 4 kHz) are recorded.

Figures 5, 5A, 5B:
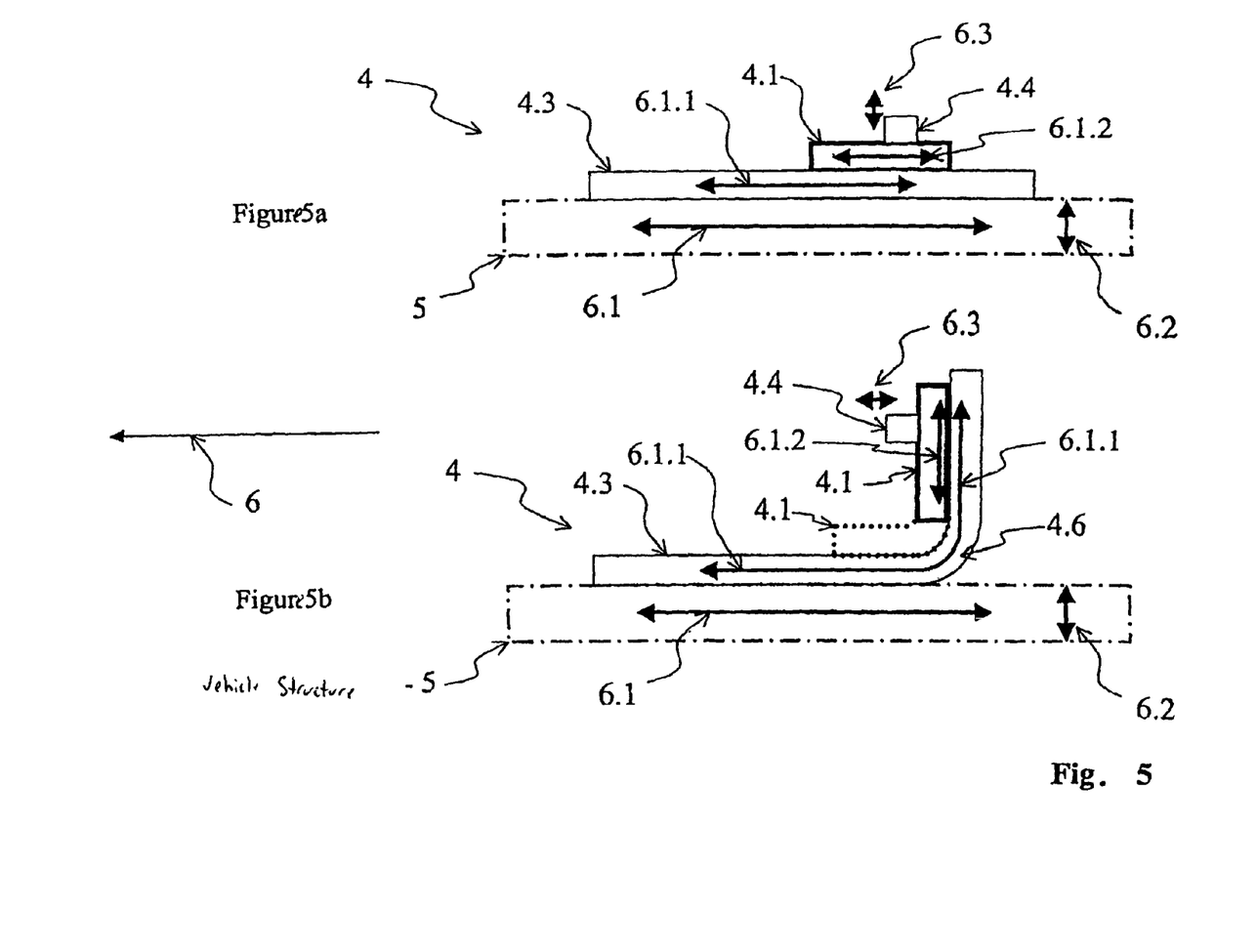
FIG. 5a shows a view of the vehicle sensor with a piezoelectric measuring value sensor, without any curvature in the bracket.
FIG. 5b shows a view of a vehicle sensor with a piezoelectric measuring value sensor with a curvature in the bracket of 90°.

FIG. 5a contains a view of a vehicle sensor 4 with a piezoelectric measuring value sensor without a curvature of the bracket 4.3. The vehicle sensor 4 is attached to a vehicle element 5, preferably by pressing in or pressing on the bracket 4.3 within or close to the central unit or close to the outer shell of the vehicle. The measuring value sensor 4.1 is preferably attached via a tensionally locked connection, such as an adhesive connection, to the bracket 4.3. The tensionally locked connection is designed in such a manner that it enables the acceleration and the structure-borne noise which affect the longitudinal direction to be recorded on the one hand, while on the other, reducing unwanted signals, or preventing them from being recorded by the measuring value sensor. A seismic mass 4.4 which is required for measuring any accelerations which occur is directly attached to the measuring value sensor 4.1, preferably using adhesive.

Alternatively, the seismic mass 4.4 is also integrated in the measuring value sensor 4.1. If the measuring value sensor 4.1 is a micromechanical sensor, for example, comb structures are provided for recording the accelerations, whose movement against each other represents a measurement of the acceleration. In this case, the seismic mass 4.4 is a movable comb structure which moves against firmly attached comb structures.

If a collision occurs in the direction of impact 6, for example when a crash occurs, the longitudinal structure-borne noise waves disseminate in the same direction 6.1 as the direction of impact 6. The direction of dissemination of the transverse structure-borne noise waves 6.2 is, however, vertical to the direction of impact 6. The longitudinal structure-borne noise waves are transferred via the bracket 4.3 to the measuring value sensor 4.1, whereby the direction of dissemination of the longitudinal structure-borne noise waves 6.1.1 transferred onto the bracket 4.3 and that of the longitudinal structure-borne noise waves 6.1.2 recorded in the measuring value sensor 4.1 runs parallel to the direction of impact and the original direction of dissemination of the longitudinal structure-borne noise wave 6.1 transferred in the vehicle element.

Due to the construction of the vehicle sensor 4 with the seismic mass 4.4 which is directly attached to the measuring value sensor 4.1, an acceleration of the measuring value sensor 4.1 is detected, which comprises a direction of dissemination 6.3 which runs vertically to the direction of dissemination of the longitudinal structure-borne noise wave. The first direction of sensitivity of the measuring value sensor 4.1 for recording the acceleration 6.3 is therefore not identical to the second direction of sensitivity of the measuring value sensor 4.1 for recording the longitudinal structure-borne noise waves 6.1.2.

In order to achieve an identical direction of sensitivity for recording both the acceleration and the longitudinal structure-borne noise waves, the longitudinal structure-borne noise waves are deflected, as shown in FIG. 5b, by a curvature in the bracket 4.3, so that the measuring value sensor 4.1 is fed the structure-borne noise waves 6.1.2 which run in the altered direction of dissemination, whereby the direction of dissemination of the acceleration 6.3 is the same as the direction of dissemination of the longitudinal structure-borne noise waves 6.1. The curvature of the bracket 4.6 is completed in such a manner that the direction of dissemination of the longitudinal structure-borne noise waves 6.1.2 is altered by 90°, but that preferably, reflection waves are prevented from being generated.

Generally, it is possible to adjust each direction of sensitivity required for recording the acceleration and the longitudinal structure-borne noise by selecting a suitable angle in the curvature of the bracket 4.6. Preferably, an angle is selected which sets the first and the second direction of sensitivity as being identical, taking into account the direction of sensitivity of the seismic mass 4.4.

If the measuring value sensor 4.1 designed as a flexible piezoelectric sensor, for example, it can no longer be attached to a straight section of the bracket 4.3, but also extends, as shown by the dotted line, over the area of curvature of the bracket 4.3. Further embodiments of the invention of the measuring value sensor 4.1 can be strain gauges, magnetic restrictive sensors of micromechanical sensors.

The bracket 4.3 is designed in such a manner that it enables the acceleration and the structure-borne noise which affect the longitudinal direction to be recorded on the one hand, while on the other, reducing unwanted signals, or preventing them from being transmitted to the measuring value sensor 4.1. The bracket is preferably designed as a Lead Frame suitable for the moulding technique, or as mechatronic bracket suitable for the moulding technique. A moulding mass which encompasses the bracket serves as a sensor housing.

Figure 6:
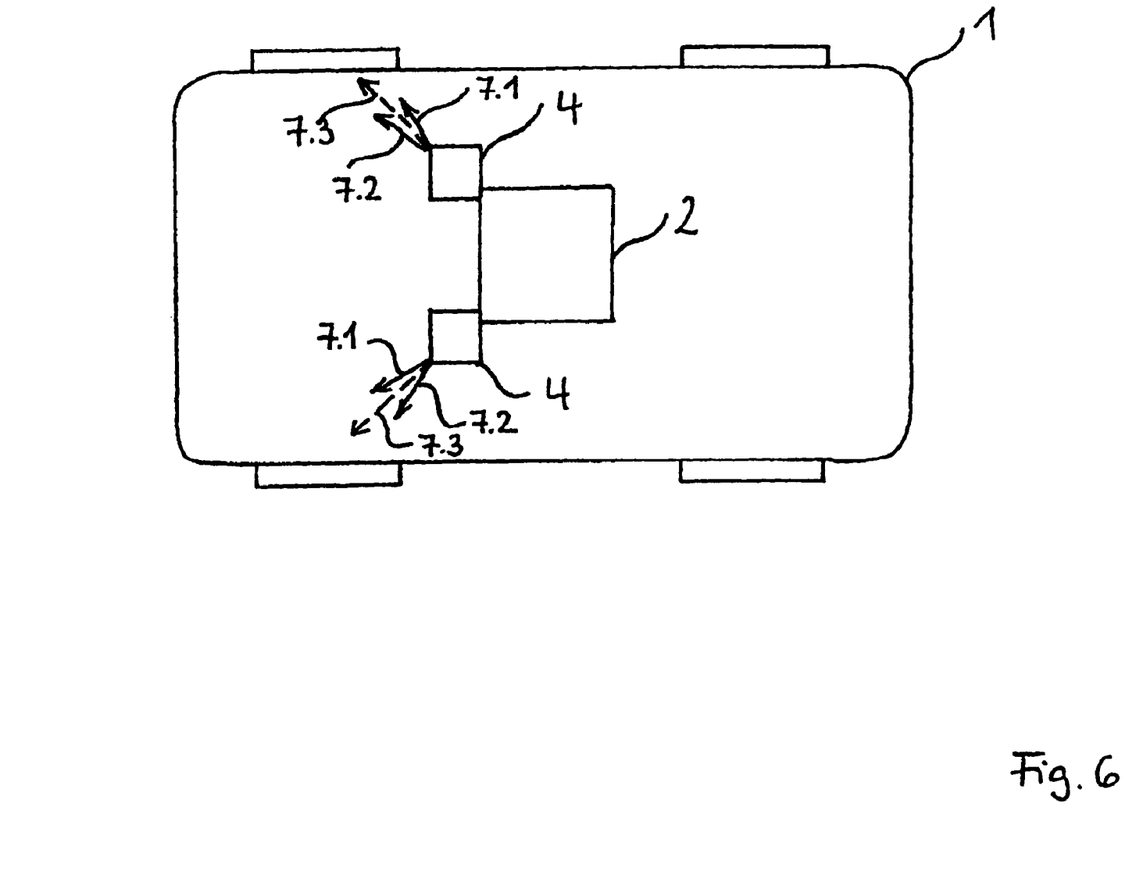
FIG. 6 shows a first embodiment of the device, with two vehicle sensors, the resulting directions of sensitivity of which are aligned to each other at an angle of 90°.

FIG. 6 shows a first embodiment of the device in a vehicle 1 with a central unit 2 and two vehicle sensors 4, whose resulting directions of sensitivity 7.3 are aligned at an angle of 90° to each other. Here, the first direction of sensitivity 7.1 and the second direction of sensitivity 7.2 of the relevant vehicle sensor 4 are aligned identically or nearly identically, the first or second sensitivity axis deviating from the resulting sensitivity axis by no more than +/−20°. With this arrangement, the level created from the longitudinal axis of the vehicle and the transverse axis of the vehicle can be monitored with regard to structure-borne noise and changes to the acceleration which are relevant to a crash.

Figure 7:
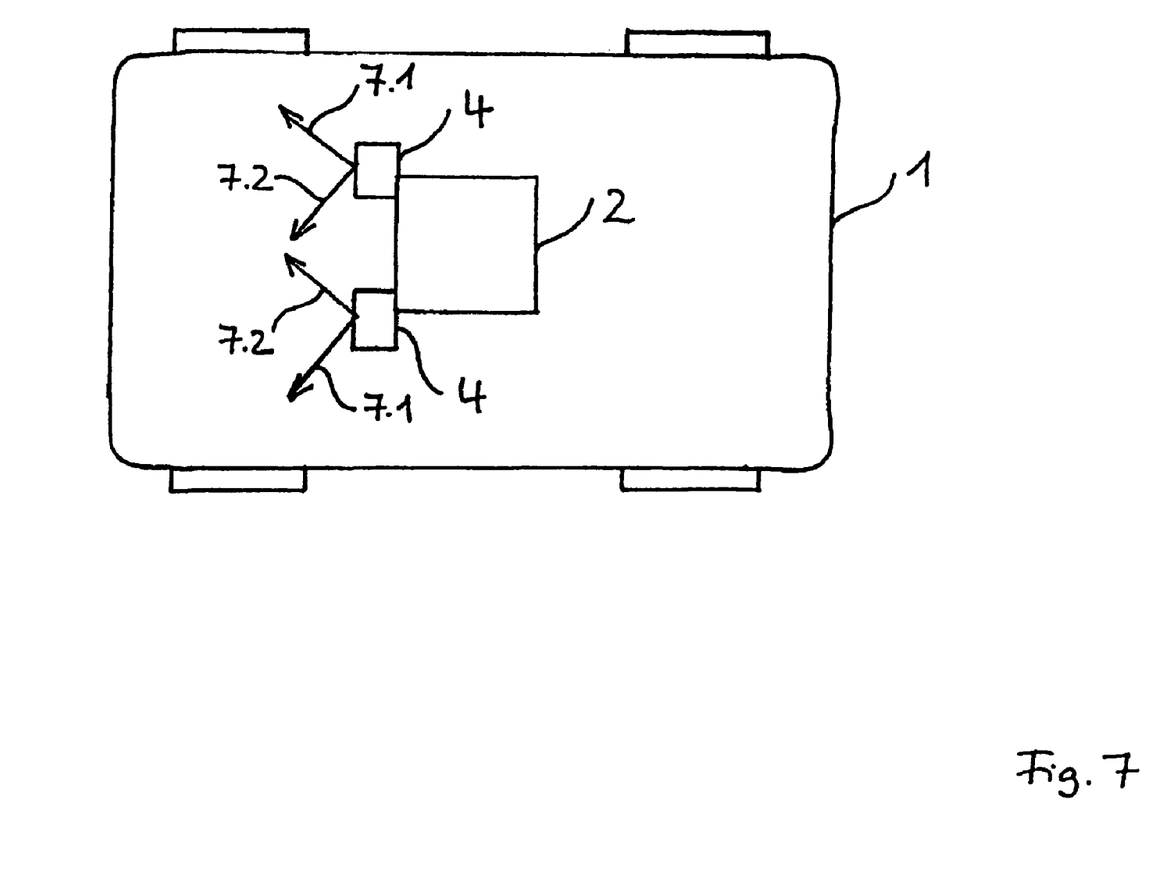
FIG. 7 shows a second embodiment of the device, with two vehicle sensors, the first direction ofسسsensitivity of the first vehicle sensor and the second direction of sensitivity of the second vehicle sensor being identical, and the second direction of sensitivity of the first vehicle sensor and the first direction of sensitivity of the second vehicle sensor being identical.

By contrast, FIG. 7 shows a second embodiment of the device in a vehicle 1 with a central unit 2 and two vehicle sensors 4, whereby the first direction of sensitivity 7.1 of the first vehicle sensor 4 and the second direction of sensitivity 7.2 of the second vehicle sensor 4 are identical, and the second direction of sensitivity 7.2 of the first vehicle sensor and the first direction of sensitivity 7.1 of the second vehicle sensor are identical.

With arrangements of this type, in which the first direction of sensitivity 7.1 and the second direction of sensitivity 7.2 are aligned differently, the signal portion of the first vehicle sensor 4 which transmits the acceleration can, for example, be linked to the signal portion of the second vehicle sensor 4 which transmits the longitudinal structure-borne noise, in order to generate a verified activation signal for a security system, in particular a passenger protection system. In reverse, the same signal verification is possible with the signal portion of the second vehicle sensor which transmits the acceleration and the signal portion of the first vehicle sensor which transmits the longitudinal structure-borne noise.

Should additional vehicle sensors 4 be arranged in the vehicle, a signal verification is also possible with signal portions of these vehicle sensors, whereby in each case, a signal portion of one vehicle sensor which transmits the acceleration is linked to a signal portion of another vehicle sensor 4 which transmits the longitudinal structure-borne noise.

Depending on the number of links between the individual signal portions and the alignment of the directions of sensitivity of the relevant vehicle sensors 4, s verifications can be conducted at different levels of complexity.

LIST OF REFERENCE NUMERALS

1 Vehicle
2 Central unit
2.1 Evaluation unit in the central unit
3.1.2 Side sensors with directions of sensitivity in the transverse and longitudinal axes of the vehicle
3.2 Upfront sensors arranged in pairs
3.3 Individual upfront sensor arranged centrally
3.4 Acceleration sensor
4 Vehicle sensor for recording an acceleration an structure-borne noise
4.1 Measuring value sensor
4.2 Processing unit
4.3 Bracket
4.4 Seismic mass
4.5 Sensor output signal
4.6 Curvature of the bracket
5 Vehicle element
5.1 Spectral portions of the acceleration
5.2 Spectral portions of the structure-borne noise
5.3 Acceleration
5.4 Structure-borne noise
5.5 Activation signal for a security system in a vehicle
6 Direction of impact
6.1 Direction of dissemination of the longitudinal structure-borne noise wave
6.1.1 Direction of dissemination of the longitudinal structure-borne noise wave transmitted onto the bracket 4.3
6.1.2 Direction of dissemination of the longitudinal structure-borne noise wave recorded in the measuring value sensor
6.2 Direction of dissemination of the transverse structure borne noise wave
6.3 Direction of dissemination of the acceleration
7.1 First direction of sensitivity of the acceleration
7.2 Second direction of sensitivity of the longitudinal structure-borne noise wave
7.3 Resulting direction of sensitivity of the vehicle sensor

The invention claimed is:

1. A device for activating a security system in a vehicle, the device comprising:
at least two vehicle sensors (4), wherein each of the vehicle sensors can record vibrations in frequency ranges, which are generated both by an acceleration and by structure-borne noise, and at least one sensor comprises a measuring value sensor (4.1) for recording vibrations;
a central unit (2) which evaluates signals from the vehicle sensors (4), and which activates the security system according to said signals, wherein the vehicle sensors;
a) comprise a first sensitivity direction (7.1) of at least one measuring value sensor (4.1) for recording the acceleration;
b) a second direction of sensitivity (7.2) of at least one measuring value sensor (4.1) for recording the structure-borne noise; and
c) the first direction of sensitivity (7.1) and the second direction of sensitivity (7.2) of each vehicle sensor (4) are aligned to each other at an angle of almost 90 degrees; and wherein the vehicle sensors are arranged in relation to each other in such a manner that the first sensitivity direction (7.1) of the first vehicle sensor and the second sensitivity direction (7.2) of the second vehicle sensor, and the second sensitivity direction (7.1) of the first vehicle sensor and the first direction of sensitivity (7.2) of the second vehicle sensor are almost identical.

2. The device according to claim 1, wherein the device conducts a signal verification of at least one of a first signal portion of the acceleration and of the structure-borne noise of a first of the vehicle sensors (4) with a signal portion of the acceleration and/or the structure-borne noise of at least one second of the vehicle sensors (4).

3. The device according to claim 2, wherein an activation signal determined from an acceleration from the first vehicle sensor is linked with a verification signal determined from the structure-borne noise from the second vehicle sensor; and
an activation signal determined from the acceleration from the second vehicle sensor is linked with a verification signal determined from the structure-borne noise from the first vehicle sensor.

4. The device according to claim 1, wherein at least one of the measuring value sensors (4.1) records the longitudinal structure-borne noise.

5. The device according to claim 1, wherein at least one of the measuring value sensors (4.1) is designed to enable a specific acceleration range to be programmed.

6. The device according to claim 5, wherein at least one of measuring value sensors (4.1) is designed to enable a specific acceleration range to be set during the manufacturing process of the vehicle sensor (4).

7. The device according to claim 1, wherein a processing unit (4.2) comprises a filter for the selective recording of the acceleration and/or the structure-borne noise.

8. The device according to claim 7, wherein the filter in the processing unit (4.2) can be programmed, in order to enable the acceleration and/or the structure-borne noise to be recorded selectively.

9. The device according to claim 8, wherein the filter in the processing unit (4.2) can be adjusted during the manufacturing process of the vehicle sensor (4), in order to enable at least one of the acceleration and the structure-borne noise to be recorded selectively.

10. The device according to claim 1, wherein a processing unit (4.2) is designed to record the signals from the at least one measuring value sensor with a high amplitude, without over-travelling an amplifying circuit arranged in the processing unit (4.2).

11. The device according to claim 1, wherein at least one measuring value sensor (4.1) is a piezoelectric sensor, a strain gauge, a micromechanical sensor or a magnetic restrictive sensor.

12. A procedure for activating a security system in a vehicle with at least two vehicle sensors (4), which record the vibrations in frequency ranges which are generated both by an acceleration and by structure-borne noise, and which comprises in each case at least one measuring value sensor (4.1) to record vibrations, and a central unit (2) which evaluates the sensor signals from the vehicle signals, and which activates the security system according to said signals, comprising:
recording an acceleration in a first direction of sensitivity (7.1) of at least one measuring value sensor (4.1); and
recording structure-born noise in a second direction of sensitivity (7.2) of at least one measuring value sensor (4.1), wherein the first direction of sensitivity (7.1) and the second direction of sensitivity (7.2) of each vehicle sensor (4) are aligned to each other at an angle of almost 90 degrees and the vehicle sensors are arranged in relation to each other in such a manner that the first direction of sensitivity (7.1) of the first vehicle sensor and the second direction of sensitivity (7.2) of the second vehicle sensor are almost identical.

13. A procedure according to claim 12, wherein a signal verification of a signal portion of the acceleration and/or the structure-borne noise from the first vehicle sensor (4) is conducted with a signal portion of the acceleration and/or the structure-borne noise of at least one second vehicle sensor (4).

14. A procedure according to claim 13, wherein an activation signal determined from the acceleration from the first vehicle sensor is linked with a verification signal determined from the structure-borne noise from the second vehicle sensor, and an activation signal determined from the acceleration from the second vehicle sensor is linked with a verification signal determined from the structure-borne sound from the first vehicle sensor.

* * * * *